US006788243B2

(12) United States Patent
Lavoie

(10) Patent No.: US 6,788,243 B2
(45) Date of Patent: Sep. 7, 2004

(54) HIDDEN MARKOV MODELING FOR RADAR ELECTRONIC WARFARE

(75) Inventor: Pierre Lavoie, Ottawa (CA)

(73) Assignee: Minister of National Defence of Her Majestry's Canadian Government The Secretary of State for Defence, Ottawa, Ontario (CA)

(*) Notice: Subject to any disclaimer, the term of this patent is extended or adjusted under 35 U.S.C. 154(b) by 0 days.

(21) Appl. No.: 10/233,658

(22) Filed: Sep. 4, 2002

(65) Prior Publication Data

US 2003/0085831 A1 May 8, 2003

Related U.S. Application Data

(60) Provisional application No. 60/317,180, filed on Sep. 6, 2001.

(51) Int. Cl.[7] .................................................. G01S 7/40
(52) U.S. Cl. ........................................ 342/13; 342/195
(58) Field of Search .............................. 342/13–20, 159

(56) References Cited

U.S. PATENT DOCUMENTS

| H513 H | 8/1988 | Dunne et al. |
|---|---|---|
| 4,827,521 A | 5/1989 | Bahl et al. |
| 4,918,455 A | 4/1990 | Maier |
| 4,977,598 A | 12/1990 | Doddington et al. |
| RE33,597 E | 5/1991 | Levinson et al. |
| 5,063,385 A | 11/1991 | Caschera |
| 5,583,505 A | 12/1996 | Andersen et al. |
| 5,900,835 A | 5/1999 | Stein |
| 6,151,574 A | 11/2000 | Lee et al. |

FOREIGN PATENT DOCUMENTS

CA     2281238 A     3/2001

OTHER PUBLICATIONS

Crespo et al; "Fast Convergence with Low Precision Weights in ART1 Networks"; Circuits and Systems, 1994, ISCAS '94; 1994 IEEE International Symposium on London, UK May 30–Jun. 2, 1994' New York, NY, USA<IEEE, US, 30 May 1004, pp 237–249, XP010143540.

(List continued on next page.)

Primary Examiner—Thomas H. Tarcza
Assistant Examiner—Isam Alsomiri
(74) Attorney, Agent, or Firm—Stites & Harbison, PLLC; Ross F. Hunt, Jr.

(57) ABSTRACT

The present invention relates to a method for identifying modern radar systems. A finite state automaton comprising a finite set of states and a set of transitions from state to state that occur in dependence upon an input signal is provided for modeling the radar system. The finite state automaton produces a sequence of output symbols from an output alphabet in dependence upon the state transitions such that the sequence of output symbols corresponds to a received electromagnetic signal emitted from the radar system. The finite state automaton is then transformed into a hidden Markov model such that a sequence of observation symbols produced from an observation alphabet by the hidden Markov model is equal to the sequence of output symbols. The method provides powerful tools for solving electronic warfare problems such the classification problem, the decoding problem, the prediction problem and the training problem. Describing the radar system as a finite state automaton and transforming it into a hidden Markov model provides flexibility and preserves a maximum of information provided by the observed signals. The new method is compatible with conventional receiver front-ends and allows integration into a wide range of legacy ES, EA and ELINT systems. The only hardware requirement is a fast processor with sufficient memory.

20 Claims, 8 Drawing Sheets

OTHER PUBLICATIONS

Cantin et al.; "Implementation of the fuzzy ART neural network for fast clustering of radar pulses"; Circuits and Systems, 1998. ISCAS '98. Proceedings of the 1998 IEEE International Symposium on Monterey, CA, USA May 31–Jun. 3, 1998; New York, NY, USA, IEEE, US, May 31, 1998, pp 458–461, XP010289150.

Granger et al.; "A What–and–Where fusion neural network for recognition and tracking of multiple radar emitters"; Neural Networks, Elsevier Science Publishers, Barking, GB, vol. 14, No. 3, Apr. 1, 2001, pap 325–344, XP004233463.

Granger et al.; "A comparison of self–organizing neural networks for fast clustering of radar pulses"; Signal Processing, Elsevier Science Publishers B.V. Amsterdam, NL, vol. 64, No. 3, Feb. 1, 1998, pp 249–269, XP0044112596.

Hopcraft et al.; "Introduction to Automata Theory, Languages, and Computation"; Addison–Wesley Publishing Company; 1997; pp. 867–1156.

Jelinek; "Statistical Methods for Speech Recognition"; The MIT Press; 1997; pp. 15–37.

Rabiner et al.; "Fundamentals of Speech Recognition"; Prentice Hall PTR; 1993; pp. 321–389.

HIDDEN MARKOV MODELING FOR RADAR ELECTRONIC WARFARE

This patent application is based upon U.S. Provisional Patent Application Serial No. 60/317,180, filed on Sept. 06, 2001.

FIELD OF THE INVENTION

This invention relates to electronic warfare and in particular to a method for recognizing observed electromagnetic signals emitted from modern radar systems, which are not stable and do not correspond to emitter modes.

BACKGROUND OF THE INVENTION

Electronic warfare (EW) is based upon the recognition of observed electromagnetic signals, in particular, radar signals. The EW is an essential component of modern warfare by providing information about, for example, the movement of enemy planes or the launch of a rocket. Such Electronic Support (ES) functions allow, for example, surveillance of enemy forces and warning of an imminent attack. Another aspect of the EW is the Electronic Attack (EA) function such as jamming an enemy radar system in order to substantially reduce the attack capability of an enemy force. A third aspect of the EW is the Electronic Intelligence (ELINT) function that is concerned with the interception and analysis of unknown radar signals for the population of databases in order to support the ES and EA functions. The ELINT function is important for ES and EA tactical systems, since these systems encounter in the field radar signals emitted from unknown radar systems, or yet unknown signals emitted from known radar systems.

In current EW systems, radar signals are recognized using histograms of observed pulses in a parametric space—for example, frequency, pulse width, angle of arrival—and temporal periodicities in the pulse train.

Andersen et al. describe in U.S. Pat. No. 5,583,505 issued Dec. 10, 1996 a radar pulse detection and classification system that receives times-of-arrival of pulses from simultaneous emitters, deinterleaves them into bands of pulse repetition intervals, and determines the pulse periodicities using autocorrelation.

Caschera describes in U.S. Pat. No. 5,063,385 issued Nov. 5, 1991 a memory system for histogramming the pulse descriptor word output of a radar warning receiver for quickly determining the number and types of emitters of the observed radar signals.

In U.S. Pat. No. 4,918,455 issued Apr. 17, 1990, Maier teaches deinterleaving of sequential signal pulses from unknown sources by clustering similar pulses into groups, and the use of those groups to form hypothetical pulse train models.

Dunne et al. describe in US Statutory Invention Registration H513 published Aug. 2, 1998 a tracking apparatus using multi-processor modules for predicting in real time the parametric behavior of radar signals to be jammed.

A major drawback of histogramming on parameters available on individual pulses is that the temporal relationship of the pulses is lost in the histogram. Furthermore, the periodic temporal analysis is limited by the assumption that the radar system is a cyclo-stationary source of pulses. This holds true only for simple radar systems over short periods of time.

Therefore, all these prior art EW systems—using histogramming and periodic temporal analysis—are based upon the assumption that the observed electromagnetic signals are stable and correspond to emitter modes. Emitter modes date back to the early days of radar when an operator changed the signal by manually switching to another electrical circuit. Therefore, the prior art EW systems are ill-suited for recognizing modern "dynamic" radar systems. For example, in response to various events modern radar systems change their emitted signal, which is automatically adjusted using a processor to maximize radar performance. The signals are no longer stable and do no longer correspond to emitter modes. Events causing a change of the emitted signal are, for example, selection of a different range display by an operator, detection of a target by the radar system and subsequently changing from a search to a tracking signal, switching between a number of periodic signal patterns to reduce blind ranges and speeds, and, launching of a missile triggering the transmission of a guidance signal from the radar system.

It is, therefore, an object of the invention to overcome the drawbacks of the prior art by providing a method capable of recognizing observed electromagnetic signals, which are not stable and do not correspond to emitter modes.

It is further an object of the invention to provide flexibility in the modeling of the radar system based upon the sensed signals and to preserve a maximum of information provided by the sensed signals.

SUMMARY OF THE INVENTION

The new method according to the invention provides the capability for recognizing modern radar systems. Describing the radar system as a finite state automaton and transforming it into a hidden Markov model provides flexibility and preserves a maximum of information provided by the observed signals. The new method is compatible with conventional receiver front-ends and allows integration into a wide range of legacy ES, EA and ELINT systems. The only hardware requirement is a fast processor with sufficient memory.

In accordance with the present invention there is provided a method for identifying a source of electromagnetic signals comprising the steps of:

receiving an electromagnetic signal emitted from the source;

providing a finite state automaton for modeling the source, the finite state automaton comprising a finite set of states and a set of transitions from state to state that occur in dependence upon an input signal, the finite state automaton for producing a sequence of output symbols from an output alphabet in dependence upon the state transitions, such that the sequence of output symbols corresponds to the received electromagnetic signal emitted from the source;

hidden Markov modeling of the finite state automaton and determining parameters of the hidden Markov model such that a sequence of observation symbols produced from an observation alphabet by the hidden Markov model is equal to the sequence of output symbols; and, identifying the source in dependence upon the determined parameters of the hidden Markov model.

In accordance with an aspect of the present invention there is provided a method for classifying source models in dependence upon an electromagnetic signal emitted from a source of electromagnetic signals comprising the steps of:

receiving the electromagnetic signal emitted from the source;

providing a plurality of L source models λ such that the L source models λ have L different observation alphabets comprising symbols being integer multiples of L different time periods, the source models λ being hidden Markov modeled finite state automatons;

transforming the received electromagnetic signal into L sequences of observation symbols O using the L different observation alphabets; and, determining for each combination of a source model λ of the L source models with a sequence of observation symbols $O^{(l)}$ of the L sequences of observation symbols an observation probability $P[\lambda^{(l)}|O^{(l)}]$, $1 \leq l \leq L$ of the source model λ for producing the sequence of observation symbols $O^{(l)}$.

In accordance with the aspect of the present invention there is further provided a method for decoding an electromagnetic signal emitted from a source of electromagnetic signals comprising the steps of:

receiving the electromagnetic signal emitted from the source;

determining a sequence of observation symbols O in dependence upon the received electromagnetic signal;

providing a source model λ, the source model λ being a hidden Markov modeled finite state automaton;

determining a plurality of sequences of state transitions Q of the hidden Markov modeled finite state automaton; and, determining for each of the sequences of state transitions Q a probability of occurrence $P[Q|O,\lambda]$ with respect to the sequence of observation symbols O.

In accordance with the aspect of the present invention there is yet further provided a method for predicting a second portion of an electromagnetic signal based upon a first portion of the electromagnetic signal emitted from a source of electromagnetic signals comprising the steps of:

receiving the first portion of the electromagnetic signal;

determining a partial sequence of observation symbols $O_t$ in dependence upon the observed first portion of the signal;

providing a source model, the source model being a hidden Markov modeled finite state automaton;

determining for each observation symbol of an observation alphabet of the source model a probability for being the next symbol at time t+1 in the sequence of observation symbols O based on a state transition probability distribution at time t of the source model and an observation symbol probability distribution of the source model at time t; and, determining a most probable observation symbol.

In accordance with the aspect of the present invention there is yet further provided a method for training a source model of a source emitting electromagnetic signals comprising the steps of:

receiving an electromagnetic signal emitted from the source;

determining a sequence of observation symbols in dependence upon the received signal emitted from the source;

providing the source model, the source model being a hidden Markov modeled finite state automaton; and, estimating a new source model based upon the probability $\xi_t(i,j)$ of the source model being in state i at time t and in state j at time t+1 for the sequence of observation symbols and the probability $\gamma_t(i)$ of the source model being in state i at time t for the sequence of observation symbols.

BRIEF DESCRIPTION OF THE FIGURES

Exemplary embodiments of the invention will now be described in conjunction with the following drawings, in which.

DETAILED DESCRIPTION OF THE INVENTION

A modern radar system is capable to change its pulse repetition interval (PRI) from one stable value to another. Given sufficient observations it is possible to determine the sequences of PRI changes that can occur and cannot occur, and the time intervals separating the different PRIs. This information is very useful for recognizing a radar system among others that use the same stable PRI values but in a different order or with different intermediate intervals. For example, a radar system emits a stable PRI followed by a sequence of pulses spaced by varying time intervals, the sequence of intervals being periodic, exhibiting partial freedom, or being entirely pseudo-random.

In addition to changing the pulse-to-pulse interval many modem radar systems emit different pulses. Recognizing the choice of pulse combined with the choice of interval by the radar system provides further information for recognizing a radar system. For example, two radar systems have a same set of pulses and intervals, but are still distinguishable if the order they emit and space their pulses differs.

In order to provide the capability for recognizing modem radar systems a new method according to the invention is disclosed. The new method describes each radar system as a finite state automaton. This provides flexibility for modeling the radar system, and preserves a maximum of information provided by the observed signals.

In the following, the method according to the invention will be explained in connection with the recognizing of modem radar systems in EW applications, but is not limited thereto. A person of skill in the art will find numerous applications of this method for recognizing electromagnetic signals emitted from sources other than radar systems.

A finite state automaton is defined as follows: "A finite state automaton consists of a finite set of states and a set of transitions from state to state that occur on input symbols chosen from an alphabet. For each input symbol, there is exactly one transition out of each state (possibly back to the state itself)." The definition and a detailed description of finite state automata are found, for example, in Hopcroft, J. E. and Ullman, J. D. "Introduction to Automata Theory, Languages and Computation" Massachusetts, Addison-Wesley, (1979).

The input symbols and state transitions of the radar system are likely unobservable by the EW system. What is observed by the EW system is the output of the finite state automaton. The output is chosen from an alphabet containing, for example, pulses and time intervals. The output is either associated with the state—called a Moore machine—or with the transition—called a Mealy machine. The Moore machine and the Mealy machine are equivalent, i.e. for any Moore machine there exists an equivalent Mealy machine as shown, for example, in Hopcroft, J. E. and Ullman, J. D.

Figure 1:
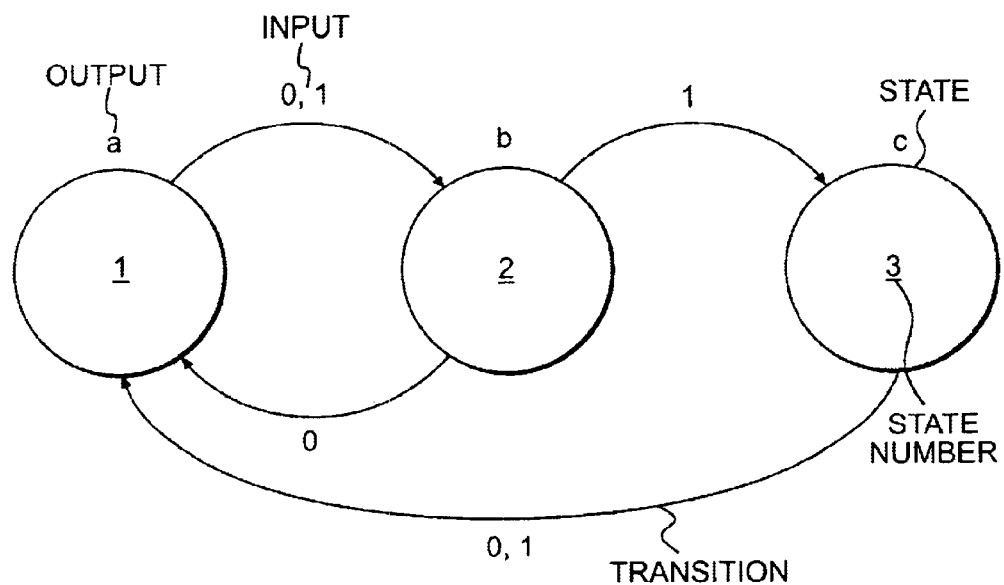
FIG. 1 is a simplified transition diagram of a finite state automaton.

Referring to FIG. 1 the state diagram of a Moore machine is shown. A state diagram is a directed graph with the vertices of the graph corresponding to the states of the finite state automaton. If there is a transition from state i to state j on input x, then there is an arc labeled from state i to state j in the state diagram. The finite state automaton described by the state diagram in FIG. 1 has three states indicated by circles 1, 2, and 3, accepts a binary input from an input alphabet {0, 1}, and produces a ternary output from an output alphabet {a, b, c}. The outputs are shown above the states. If the automaton is in state 1 and reads an input it necessarily enters state 2 because the corresponding arc is labeled with both input symbols 0 and 1. Two arcs are leaving state 2, one labeled 0 going to state 1, and one labeled 1 going to state 3. The next state, therefore, depends on the input symbol read by the automaton. It is state 1 if the automaton reads an input symbol 0 or it is state 3 if the automaton reads an input symbol 1. If the automaton is in state 3 and reads an input symbol it goes to state 1. For example, starting in state 1 and reading an input sequence of consecutive 0s, the automaton produces the output sequence ababab . . . . Starting in the same state and reading an input sequence of consecutive 1s, it produces abcabcabc . . . .

The finite state automaton representation of a radar system allows analysis of its dynamic behavior for three reasons.

First, the dynamic behavior of the radar system is readily apparent upon examination of the state transitions. Every time the finite state automaton is in a state from which transition is possible to two or more states, the next state is selected based on the input symbol. Therefore, the finite state automaton representation of the radar system takes into account that the radar system is driven by events resulting in input symbols that are randomly chosen, controlled by a tracking process, controlled by an operator, etc. If the finite state automaton contains no state from which transition is possible to two or more states the corresponding radar system is not dynamic, i.e. it produces a periodic signal.

Second, the finite state automaton representation provides flexibility for modeling a radar system by allowing the output alphabet to contain pulses, intervals, pulses combined with intervals, bursts of consecutive pulses, portions of continuous wave (CW) signals, etc. Furthermore, the pulses, intervals, etc. represented by the output symbols need not to have a same duration.

Third, representing a radar system as a finite state automaton allows analysis using hidden Markov models (HMM).

HMMs have been used very successfully for speech recognition. A detailed description of the HMMs is given, for example, in Rabiner, Lawrence and Juang, Biing-Hwang "Fundamentals of Speech Recognition", New Jersey: Prentice Hall (1993), and Jelinek, Frederick "Statistical Methods for Speech Recognition (Language, Speech, and Communication)", Cambridge, Mass.: MIT Press. (1999).

Jelinek and Frederick describe in "Continuous Speech Recognition by Statistical Methods", Proc. IEEE, 64(4), 532–556, (1976) statistical methods of automatic recognition of continuous speech concerning the modeling of a speaker and of an acoustic processor, extraction of the models' statistical parameters, hypothesis search procedures, and likelihood computations of linguistic decoding.

Levinson et al. disclose in U.S. Pat. No. RE 33,597 reissued in May 28, 1991, in a speech recognizer storing of a set of signals each representative of a prescribed acoustic feature and storing of a template for each spoken reference word which comprises signals representative of a first state, a last state and a preselected number of intermediate states of a constrained HMM.

Doddington et al. teach in U.S. Pat. No. 4,977,598 issued in Dec. 11, 1990 an efficient pruning method which reduces computer processing unit loading during speech recognition by means of a HMM.

Bahl et al. describe in U.S. Pat. No. 4,827,521 issued in May 2, 1989 training of Markov models in a speech recognition environment, wherein word decoding accuracy is maximized by maximizing the difference between the probability of the correct script of uttered words given the label outputs and the probability of any other script.

An HMM is characterized by the following definitions, which will be used throughout the disclosure of the invention:

1. N being the number of states in the model. The states are hidden, i.e. they are not observable. The individual states are labeled as $\{1, 2, \ldots, N\}$, and the state of the model at time t is $q_t$.
2. M being the number of distinct observation symbols per state, i.e. the discrete alphabet size. The observation symbols correspond to the physical output of the system being modeled. The individual symbols are denoted as $V=\{v_1, v_2, \ldots, v_M\}$.
3. $A=\{a_{ij}\}$ being a state transition probability distribution where $$a_{ij}=P[q_{t+1}=j|q_t=i], \quad 1 \leq i,j \leq N. \tag{1}$$

In the special case where each state reaches every other state of the model in a single step, we have $a_{ij}>0$ for all (i,j) pairs. In other cases we have $a_{ij}=0$ for one or more (i,j) pairs.

4. $B=\{b_j(k)\}$ being an observation symbol probability distribution, in which $$b_j(k)=P[o_t=v_k|q_t=j], \quad 1 \leq k \leq M. \tag{2}$$

The observation symbol probability distribution defines the symbol distribution in state j, j=1, 2, . . . , N, and $o_t$ denotes the observation symbol at time t.

5. $\pi=\{\pi_i\}$ being an initial state distribution where $\pi_i=P[q_1=i], 1 \leq i \leq N$.

Given appropriate values of N, M, A, B, and π the HMM generates an observation sequence $O=(o_1 o_2 \ldots o_T)$ with each observation $o_t$ being one of the symbols from V, and with T being the number of observations in the sequence. For brevity, the compact notation $\lambda=(A,B,\pi)$ will be used in the following to denote a complete parameter set of the HMM.

Based upon the above described characterization it is possible to model the states and outputs of a finite state automaton as states and observation symbols in the HMM. The main difference is that transitions are driven by input symbols in the finite state automata while they occur statistically in HMMs. Therefore, every transition out of every state—possibly back to the state itself—in the finite state automaton is modeled as a non-zero transition probability in the probability distribution A of the HMM. The lack of a transition in the finite state automaton is modeled as a zero transition probability in the probability distribution A. The difference between the finite state automaton and the HMM accommodates the fact that the input symbols and state transitions are unobservable in EW applications.

Numerous HMMs are able to produce observation sequences explaining the output sequences of a given finite state automaton. In the following three possible HMMs explaining the output sequences of the Moore machine shown in FIG. 1 will be described.

Figure 2:
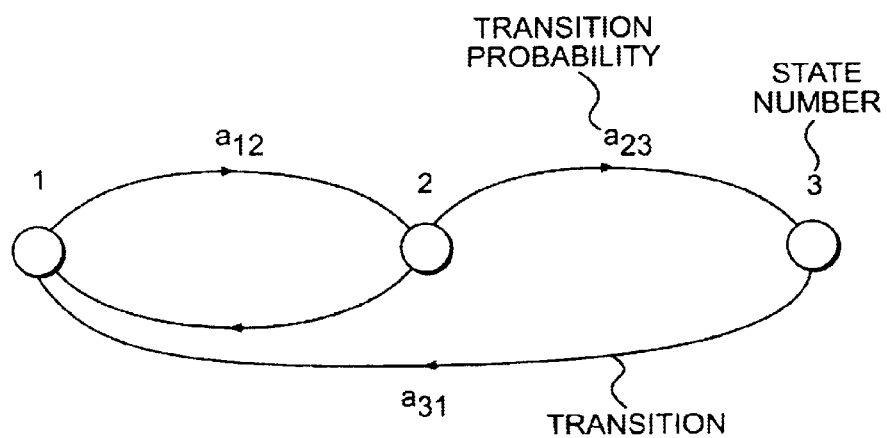
FIG. 2 is a simplified diagram illustrating a hidden Markov model for generating observation sequences produced by the finite state automaton of FIG. 1.

Referring to FIG. 2 a possible HMM which is able to produce observation sequences explaining the output sequences of the finite state automaton of FIG. 1 is shown. The HMM of FIG. 2 has N=3 states. Each state corresponds to one of M=3 observation symbols, $v_1=a$, $v_2=b$, and $v_3=c$, respectively. The observation alphabet of this model is identical to the output alphabet of the finite state automaton. A possible state transition probability A is given by $$A = \{a_{ij}\} = \begin{bmatrix} 0 & 1 & 0 \\ 0.5 & 0 & 0.5 \\ 1 & 0 & 0 \end{bmatrix}$$

where transition from state 1 is always to state 2, transition from state 3 is always to state 1, and transitions from state 2 to states 1 and 3 have been chosen to be equiprobable.

Figure 3:
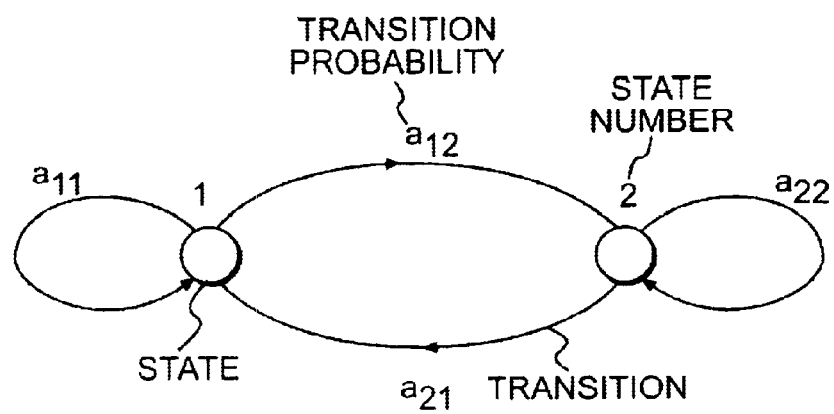
FIG. 3 is a simplified diagram illustrating another hidden Markov model for generating observation sequences produced by the finite state automaton of FIG. 1.

Referring to FIG. 3 another possible HMM which is able to produce observation sequences explaining the output sequences of the finite state automaton of FIG. 1 is shown. The HMM of FIG. 3 has N=2 states. Each state corresponds to one of M=2 observation symbols, $v_1=ab$, and $v_2=abc$, respectively. In this model the observation alphabet is different from the output alphabet of the finite state automaton. A possible state transition probability distribution A is given by $$A = \{a_{ij}\} = \begin{bmatrix} 0.5 & 0.5 \\ 0.5 & 0.5 \end{bmatrix}$$

where all transition have been chosen to be equiprobable.

Before introducing the third HMM modeling for discrete time and uniform symbol duration will be explained in the following.

In practice, most radar systems contain a clock, which is used to produce pulse to pulse intervals as integer multiples of the clock period. Generally, it is possible in EW systems to estimate the radar clock period, or a multiple thereof. In the following this estimated period is denoted $\tau$. For simplicity $\tau$ is assumed to be exact in following description, but as is evident to a person of skill in the art the invention is not limited thereto. Having estimated the radar period it is possible to transform the observation signal into a sequence of observation symbols—$O=(o_1 o_2 \ldots o_T)$, wherein the duration of each symbol $o_t$ is equal to an integer multiple of the clock period $\tau$. This implies proper synchronization and an observation alphabet V where the symbol durations are all multiples of $\tau$.

For modeling radar systems that do not use a clock, either $\tau$ is chosen to be very small, or a continuous-time HMM is used.

To illustrate the discrete-time modeling the discrete-time output alphabet, shown in Table 1, is chosen for the finite state automaton of FIG. 1.

TABLE 1

| Symbol | Duration | Description |
| --- | --- | --- |
| a | 1 $\tau$ | a pulse |
| b | 2 $\tau$ | Symbol a followed by an empty interval of one clock period |
| c | 3 $\tau$ | Symbol a followed by an empty interval of two clock periods |

Denoting by 1 an interval containing a pulse, and by 0 an empty interval the output alphabet is rewritten as a =1, b=10, and c=100.

Figure 4:
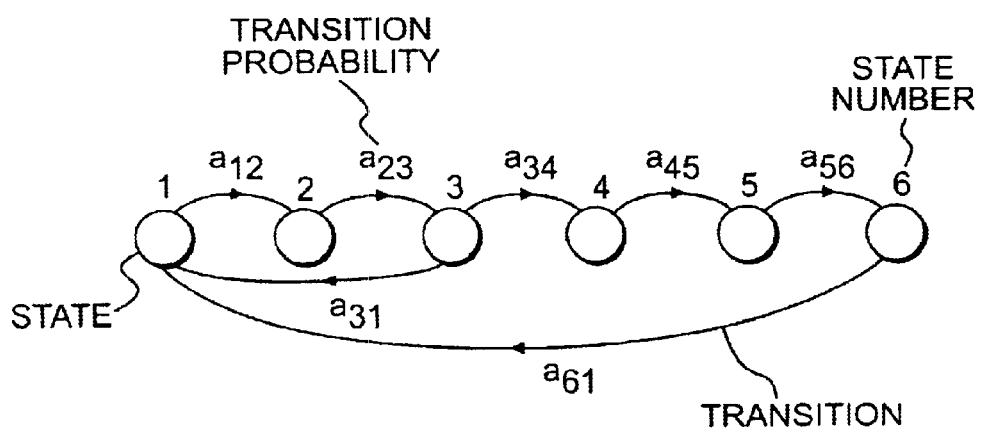
FIG. 4 is a simplified diagram illustrating the hidden Markov model of FIG. 2 modified to accept observation symbols of uniform duration.

Referring now to FIG. 4 the states and possible transitions of a third HMM of the finite state automaton of FIG. 1 is shown, which accounts for output sequences produced by a discrete-time finite state automaton. This model is essentially the HMM of FIG. 2 modified to accept observation symbols of uniform duration $\tau$. Defining M=2 observation symbols, $v_1=1$ and $v_2=0$, and then dividing each original state into one or more new states based on the duration of the associated original symbol N=6 new states are obtained with the state transition probability distribution $$A = \{a_{ij}\} = \begin{bmatrix} 0 & 1 & 0 & 0 & 0 & 0 \\ 0 & 0 & 1 & 0 & 0 & 0 \\ 0.5 & 0 & 0 & 0.5 & 0 & 0 \\ 0 & 0 & 0 & 0 & 1 & 0 \\ 0 & 0 & 0 & 0 & 0 & 1 \\ 1 & 0 & 0 & 0 & 0 & 0 \end{bmatrix}.$$

Figure 5:
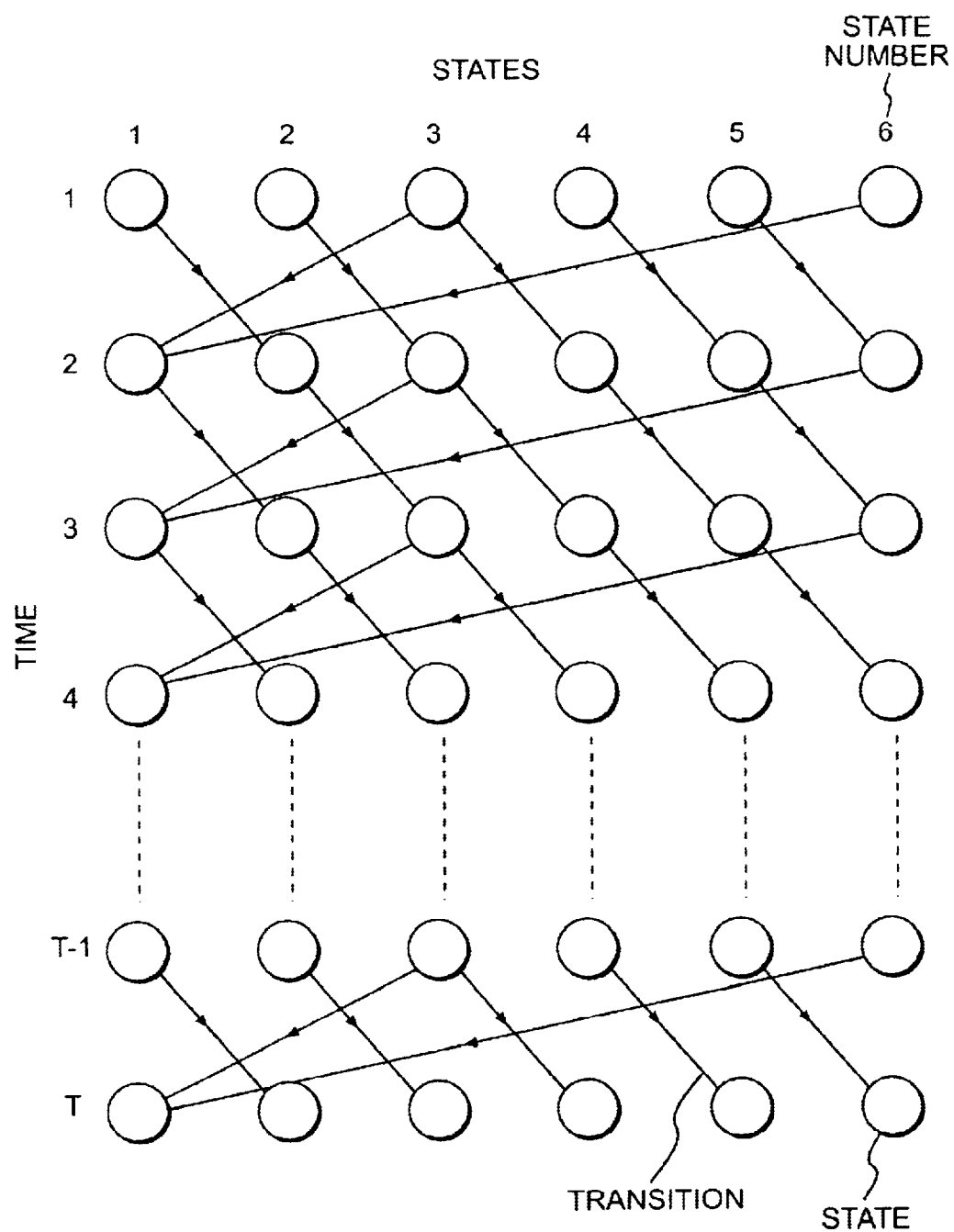
FIG. 5 is a simplified Trellis diagram derived from the hidden Markov model of FIG. 4.

Given the states and transitions of a uniform discrete-time HMM, it is possible to construct a graph called the "Trellis diagram" as follows. First, T copies of the N states are replicated. The N states of the tth copy correspond to the HMM at time t. A line with an arrow connects a state $A_t$ of the tth copy with a state $A_j$ of the (t+1)th copy if the corresponding transition probability $a_{ij}$ is positive. For example, FIG. 5 shows the Trellis diagram for the HMM of FIG. 4. The Trellis diagram leads to fast solution methods for many problems of interest.

In the models shown above a single observation symbol has been associated to each state of the HMM. In the following we now consider the possibility of errors to occur during the observation a signal emitted from the radar system. It is possible to consider such errors in the HMM by means of the observation symbol probability distribution B, which will be explained in the following using the third model, but is not limited thereto.

For example, a pulse is observed when the radar output was an empty interval. Using radar nomenclature we call this event a false alarm and denote the false alarm probability as $P_F$. Conversely, it is possible that nothing is observed when the radar output was a pulse. This event is called a miss and the miss probability is denoted $P_M$. Formally, we have $$P_F = P[o_t = 1 | \text{output 0 at } t] \quad (3)$$

$$P_M = P[o_t = 0 | \text{output 1 at } t]. \quad (4)$$

The corresponding observation symbol distribution $B=\{b_j(k)\}$, $b_j(k)=P[o_t=v_k|q_t=j]$, $j=1, 2, \ldots, 6$, for the uniform discrete-time HMM of FIG. 4 is shown in Table 2.

TABLE 2

| j | k | $v_k$ | $B_j(k)$ |
|---|---|---|---|
| 1 | 1 | 1 | $1 - P_M$ |
| 1 | 2 | 0 | $P_M$ |
| 2 | 1 | 1 | $1 - P_M$ |
| 2 | 2 | 0 | $P_M$ |
| 3 | 1 | 1 | $P_F$ |
| 3 | 2 | 0 | $1 - P_F$ |
| 4 | 1 | 1 | $1 - P_M$ |
| 4 | 2 | 0 | $P_M$ |
| 5 | 1 | 1 | $P_F$ |
| 5 | 2 | 0 | $1 - P_F$ |
| 6 | 1 | 1 | $P_F$ |
| 6 | 2 | 0 | $1 - P_F$ |

For brevity and HMM corresponding to a radar system is called the radar model. We assume that the EW system contains L competing radar models. The individual radar models are denoted as $\lambda^{(1)}, \lambda^{(2)}, \ldots, \lambda^{(L)}$. The models have different time periods, which are denoted as $\tau^{(1)}, \tau^{(2)}, \ldots, \tau^{(L)}$. Hence, for a given observation signal, there are several observation sequences, which are denoted as $O^{(1)}, O^{(2)}, \ldots, O^{(L)}$, respective to the different time periods.

Figure 6:
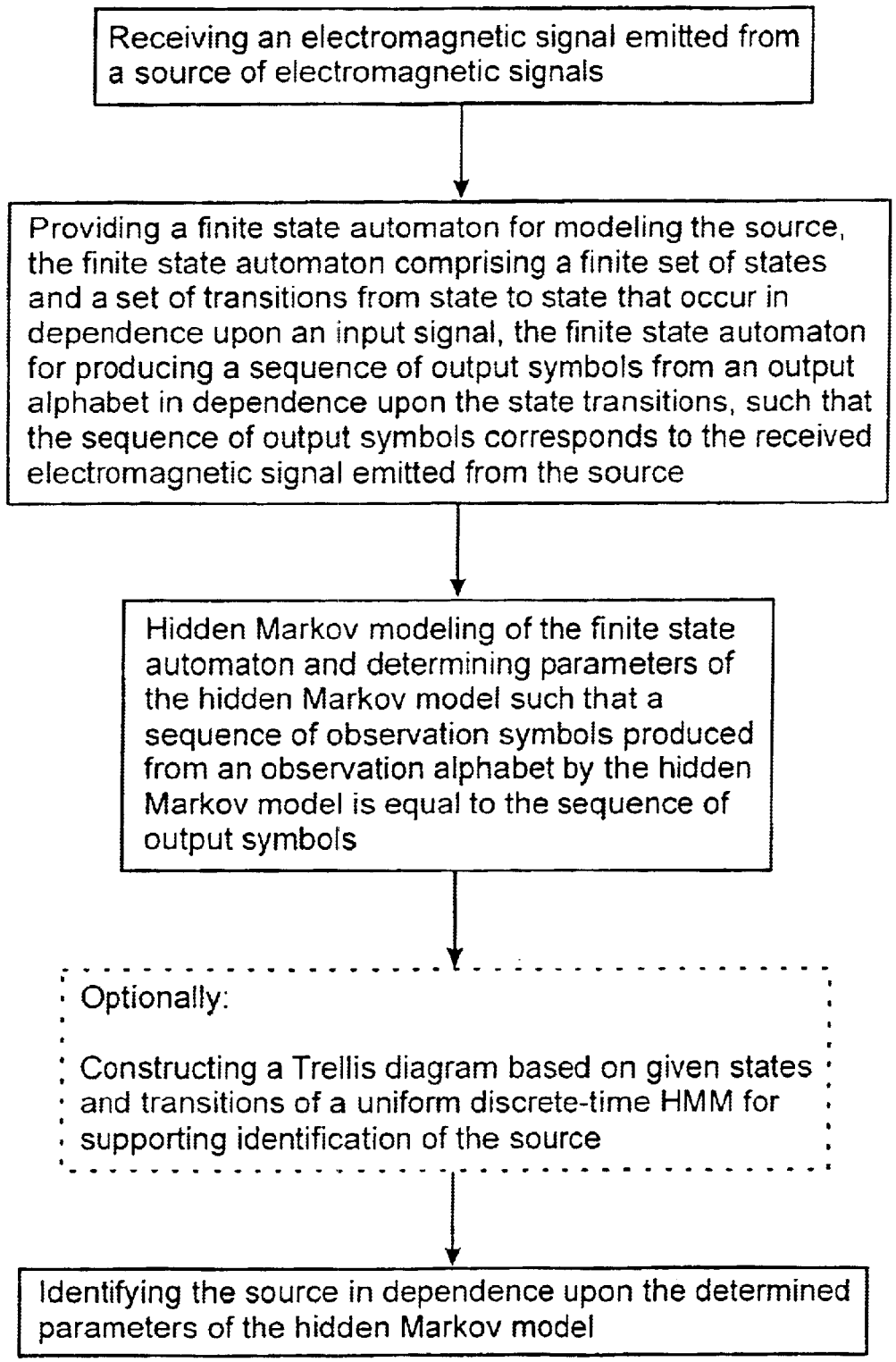
FIG. 6 is a simplified flow diagram of a method according to the invention for modeling a radar system.

Referring to FIG. 6, a method for modeling a radar system according to the invention is shown. In a first step, the radar system is described as a finite state automaton comprising a finite set of states and a set of transitions from state to state that occur in dependence upon an input signal. The finite state automaton produces a sequence of output symbols from an output alphabet in dependence upon the state transitions such that the sequence of output symbols corresponds to an observed electromagnetic signal emitted from the radar system. In a second step the finite state automaton is transformed into a HMM such that a sequence of observation symbols produced from an observation alphabet by the HMM is equal to the sequence of output symbols. Optionally, given the states and transitions of a uniform discrete-time HMM, a Trellis diagram is constructed.

For simplicity, discussion of the various concepts of the invention has been limited to the observation of discrete symbols chosen from an alphabet. However, it is important to note that it is possible to generalize all the disclosed concepts to continuously distributed multivariate observations. This is achieved by replacing the observation symbol probability distribution with a joint probability density function for which a HMM training procedure has been formulated. Compliant joint density functions include elliptically symmetric density functions like multivariate Gaussians and multivariate mixtures like Gaussian sums. In EW, generalization to multivariate observations allows use of parameters like pulse width and frequency.

In modern electronic warfare four basic problems are encountered.

The first problem is the classification problem: given an observed signal and L competing radar models $\lambda^{(1)}, \lambda^{(2)}, \ldots, \lambda^{(L)}$, how is the model chosen which best matches the observed signal?

The second problem is the decoding problem: given the observation sequence O and the radar model $\lambda$, how is a state sequence $\hat{Q}=(\hat{q}_1\hat{q}_2\ldots\hat{q}_T)$ chosen which explains best the observations?

The third problem is the prediction problem: given the partial observation sequence $(o_1 o_2 \ldots o_t)$ and the radar model $\lambda$, how is the next observation symbol $\hat{o}_{t+1}=v_k$ predicted and the associated probability $P[o_{t+1}=v_k|o_1 o_2 \ldots o_t, \lambda]$ computed?

The fourth problem is the training problem: given only the observation sequence O, how is the radar model $\lambda$ adjusted—or trained—so that it best describes the generation of the observed signals produced by the radar system?

The classification problem is critical for ES and EA. Current approaches use histograms of the pulses in a parametric space and temporal periodicities in the pulse train, extract parameters and match them to competing entries in a library. When the extracted parameters fall into an overlap area of two or more entries of the library, the emitter is not uniquely identified, resulting in an ambiguity. EW systems are designed to communicate multiple candidate identifications to the operator. For example, a friendly emitter leads to multiple candidate identifications that include a threat. This triggers an unnecessary alert, jeopardizing safety and increasing the risk of fracticide. Since the method for modeling a radar system according to the invention preserves more information about the radar system than current approaches, it has the potential to substantially enhance the classification of radar systems.

Since the L competing radar models have different time periods the observation signal is transformed into L sequences of observation symbols, $O^{(1)}, O^{(2)}, \ldots, O^{(L)}$, where the duration of each symbol $o_t^{(l)}$ of the lth sequence is equal to an integer multiple of the lth time period $\tau^{(l)}$, $1 \leq l \leq L$.

Formally, the classification problem now becomes: given $O^{(1)}, O^{(2)}, \ldots, O^{(L)}$ and $\lambda^{(1)}, \lambda^{(2)}, \ldots, \lambda^{(L)}$, how is the most probable of the L radar models chosen?

From Bayesian decision theory, one of the most useful decisions is to maximize the a posteriori probability. The maximum a posteriori (MAP) decision is to choose $$l_{MAP} = \mathop{\mathrm{argmax}}_{1 \leq l \leq L} P[\lambda^{(l)} | O^{(l)}]. \tag{5}$$

Using Bayes rule, we have $$P[\lambda | O] = \frac{P[O | \lambda] P[\lambda]}{P[O]}. \tag{6}$$

Since P[O] is not a function of $\lambda$, the MAP decision is also defined as $$l_{MAP} = \mathop{\mathrm{argmax}}_{1 \leq l \leq L} P[O^{(l)} | \lambda^{(l)}] P[\lambda^{(l)}]. \tag{7}$$

However, the MAP decision requires prior knowledge of the probabilities $P[\lambda^{(l)}]$, $1 \leq l \leq L$, which is not always available.

When the probabilities $P[\lambda^{(l)}]$, $1 \leq l \leq L$, are not known a priori, it is assumed that the competing radar models are equiprobable. Then the maximum likelihood (ML) decision is used which is defined as follows $$l_{ML} = \mathop{\mathrm{argmax}}_{1 \leq l \leq L} P[O^{(l)} | \lambda^{(l)}]. \tag{8}$$

Whether the MAP or ML decision is used for each of the L competing radar models the probability of the sequence for a given model is computed. This problem is called the evaluation problem: given an observation sequence $O=(o_1 o_2 \ldots o_T)$ and a radar model $\lambda$, how is $P[O|\lambda]$—the probability of the sequence for a given radar model—computed?

One possibility is a direct approach to solving the evaluation problem. However, since computing the probability of O given a state sequence Q requires the order of T calculations, and since there are $N^T$ possible state sequences, a direct computation of $P[O|\lambda]$ requires in the order of $TN^T$ calculations. Because of the large number of calculations and its non-polynomial complexity, the direct approach is practical only for small HMMs.

A method for solving the evaluation problem for large HMMs is the forward-backward procedure which is described in detail, for example, in Baum, L. E. and Egon, J. A. "An Inequality with Applications to Statistical Estimation for Probabilistic Functions of a Markov Process and to a Model for Ecology", Bull. Amer. Meteorol. Soc., 73, 360–363, (1967), and Baum, L. E. and Sell, G. R. "Growth Functions for Transformations on Manifolds", Pac. J. Math., 27(2), 211–227, (1968). The solution of the evaluation problem using the forward-backward procedure requires in the order of $N^2T$ calculations.

Consider the forward variable $$\alpha_t(i) = P[o_1 o_2 \ldots o_t, q_t=i|\lambda], \quad (9)$$

i.e. the probability of the model being in state i at time t and observing the partial sequence $(o_1 o_2 \ldots o_t)$, for a given model $\lambda$. The forward variable at time t=1 is the joint probability of state i and observation $o_1$, $$\alpha_1(i) = \pi_i b_i(o_1), \quad 1 \leq i \leq N. \quad (10)$$

At time t=2 the forward variable is $$\alpha_2(i) = \left[\sum_{i=1}^{N} [\pi_i b_i(o_1)] a_{ij}\right] b_j(o_2)$$

$$= \left[\sum_{i=1}^{N} \alpha_1(i) a_{ij}\right] b_j(o_2), \quad 1 \leq i \leq N.$$

Proceeding inductively, we obtain for $1 \leq t \leq T-1$, $$\alpha_{t+1}(i) = \left[\sum_{i=1}^{N} \alpha_t(i) a_{ij}\right] b_j(o_{t+1}), \quad 1 \leq i \leq N. \quad (11)$$

Finally, the sum of the terminal forward variables provides the solution to the evaluation problem, i.e.

$$P[O|\lambda] \sum_{i=1}^{N} \alpha_T(i). \quad (12)$$

The forward-backward procedure owes its efficiency to the Trellis representation of uniform discrete-time HMMs.

Once the evaluation problem has been solved it is possible to compute for each of the L models in the classification problem the probability of the sequence for each given model and to decide between the models using the MAP or the ML criterion.

A special situation occurs when the ES or EA system encounters in the field either an unknown radar system, or an unknown signal produced by a known radar system. When such a situation occurs it is not desired that the ES or EA system chooses a model of its library for the unknown signal, but provides an indication that an unknown signal has been observed. This results in a decision with a reject option. Formally, the decision problem has then (L+1) values: 1, 2, . . . , L, and "reject".

Figure 7:
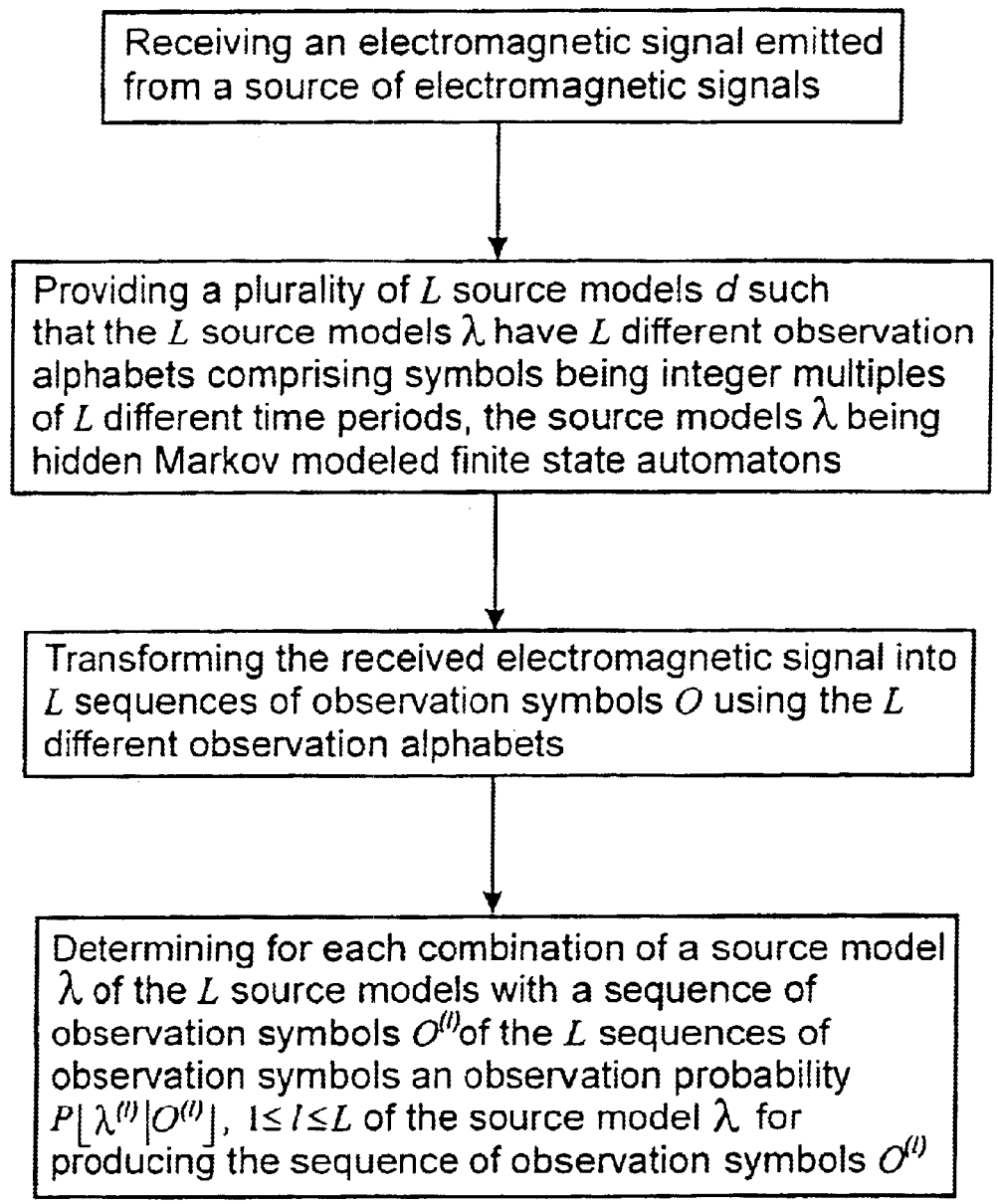
FIG. 7 is a simplified flow diagram of a method according to the invention for classifying radar models.

Referring to FIG. 7 a simplified flow diagram of a method for classifying radar models according to the invention is shown.

The decoding problem is: given the observation sequence O and the radar model $\lambda$, how is a state sequence $\hat{Q}=(\hat{q}_1 \hat{q}_2 \ldots \hat{q}_T)$ chosen which explains best the observations?

Particularly useful for ES and EA applications is not so much the complete state sequence $\hat{Q}$, as the recognition of specific state transitions providing situational information. For example, when a missile is launched, the associated radar system often changes its signal to guide the missile. In order for the radar signal to change, some state transition has to occur in the finite state automaton of the radar. By observing the state transition that corresponds to a missile launch, the ES or EA system is able to recognize the event and to warn that a missile is airborne. In another example, when a radar senses a new target it often changes its signal to estimate the position and velocity of the target. Again in order for the radar signal to change, some state transition has to occur in the finite state automaton of the radar. By observing this state transition the ES or EA system is able to warn that a target is being acquired.

Assuming that the radar system has already been classified, the motivation behind the decoding problem is to recognize changes in the radar signal and, ultimately, to infer what events are happening. If the HMM contains the state transitions that correspond to critical events it substantially enhances situational awareness.

The solution to the decoding problem depends on the choice of an optimality criterion to determine which sequence is the best. The optimality criterion is to maximize $P[Q|O, \lambda]$. This criterion accounts for the probability of occurrence of sequences of states. Therefore, it yields a sequence for which all state transitions have positive probability, i.e. a valid sequence.

For solving the decoding problem the dynamic programming method—also known as the Viterbi method—is used. Detailed information about this method is provided, for example, in Bellman, Richard "Dynamic Programming", New Jersey, Princeton University Press, (1957), and in Bertsekas, Dimitri "Dynamic Programming and Optimal Control" 2 ed. Belmont, Mass.: Athena Scientific, (2000). Optionally, less optimal methods such as the stack method are also applicable for solving the decoding problem. In particular, if exhaustive exploration of the Trellis diagram is prohibitive.

Figure 8:
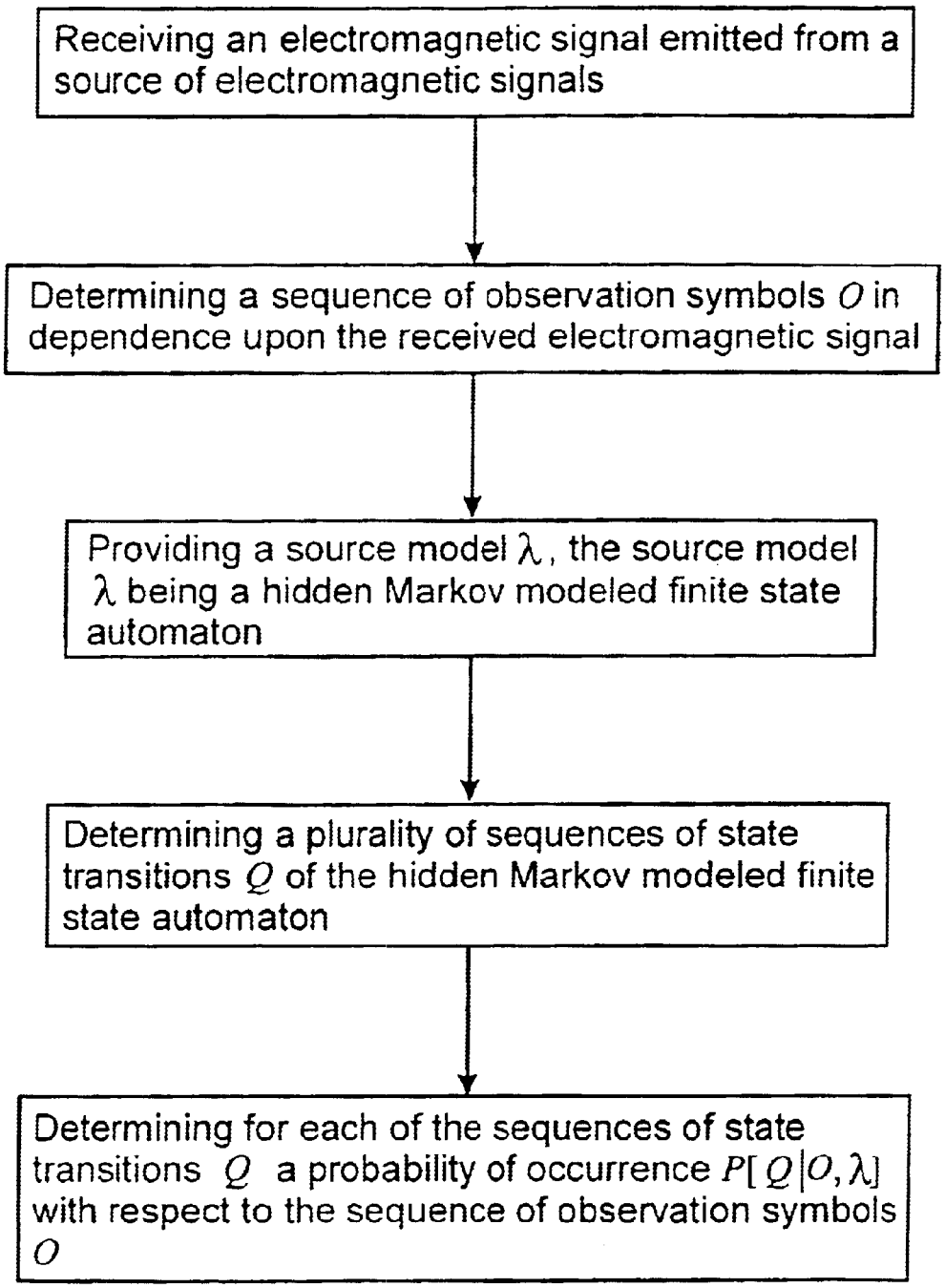
FIG. 8 is a simplified flow diagram of a method according to the invention for decoding an observed signal emitted from a radar system.

FIG. 8 illustrates a simplified flow diagram of a method for decoding an observed signal emitted from a radar system according to the invention.

The prediction problem is: given the partial observation sequence $(o_1 o_2 \ldots o_t)$ and the radar model $\lambda$, how is the next observation symbol $\hat{o}_{t+1}=v_k$ predicted and the associated probability $P[o_{t+1}=v_k|o_1 o_2 \ldots o_t, \lambda]$ computed?

This problem is of particular interest for EA systems using deceptive electronic countermeasures techniques. For example, the range gate pull-off technique involves the transmission of false echo pulses just before the arrival of the actual radar pulses to create a false target. To simulate an inbound target the jammer anticipates the reception of the radar pulse and transmits a false echo pulse before the radar pulse. For this technique to work it is crucial that the time of arrival of the radar pulse is predicted reliably and accurately.

This problem is closely related to the evaluation problem and similarly solved. Using the forward variable the probability that the next symbol is $v_k$ is $$P[o_{t+1} = v_k \mid o_1 o_2 \ldots o_t, \lambda] = \frac{P[o_{t+1} = v_k, o_1 o_2 \ldots o_t \mid \lambda]}{P[o_1 o_2 \ldots o_t \mid \lambda]} \quad (13)$$

$$= \frac{\sum_{j=1}^{N}\left[\sum_{i=1}^{N} \alpha_t(i) a_{ij}\right] b_j(k)}{\sum_{i=1}^{N} \alpha_t(i)}. \quad (14)$$

Therefore, the most probable symbol $v_k$ to occur at time $t+1$ is $$\hat{o}_{t+1} = \underset{1 \le k \le M}{\operatorname{argmax}} \left[ \sum_{j=1}^{N}\left[\sum_{i=1}^{N} \alpha_t(i) a_{ij}\right] b_j(k) \right]. \quad (15)$$

Similarly the HMM is used to predict the most probable symbol to occur at time $t+2$, $t+3$, etc. Furthermore, it is possible to use the HMM in a similar fashion to estimate the time a given symbol is most likely to be observed next.

Figure 9:
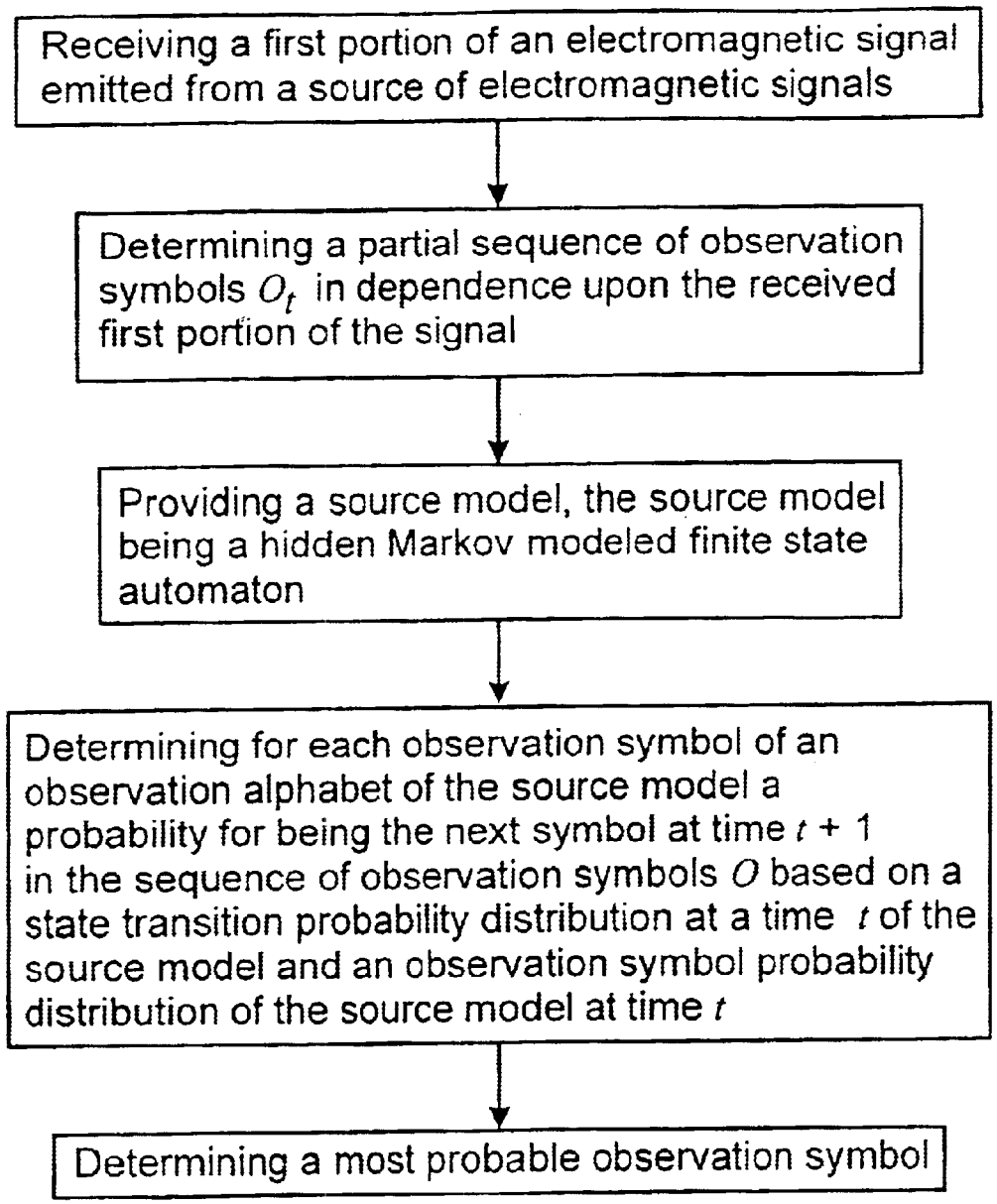
FIG. 9 is a simplified flow diagram of a method according to the invention for predicting a next observation symbol given a partial observation sequence; and, FIG. 10 is simplified flow diagram of a method for training a radar model according to the invention.

A simplified flow diagram of a method according to the invention for predicting a next observation symbol given a partial observation sequence is shown in FIG. 9.

The training problem is: given only the observation sequence O, how is the radar model $\lambda$ adjusted—or trained—so that it best describes the generation of the observed signals produced by the radar system?

Prior to solving the classification, decoding and prediction problems radar models are needed. Training an HMM is viewed as a reverse engineering problem: knowing what the radar produces, what is the finite state automaton in the radar model? The training problem is of particular interest for ELINT, a branch of the EW concerned with the interception and analysis of radar signals for the population of databases.

Ideally, the training problem is defined as finding the maximum a posteriori radar model $$\lambda_{MAP} = \underset{\lambda}{\operatorname{argmax}} P[\lambda \mid O]. \quad (16)$$

However, the solution to this equation is most likely not unique. In practice we have only partial knowledge of the probabilities $P[\lambda]$ for all possible $\lambda$s and the search space comprising all possible $\lambda$s is very large.

Not knowing the number N of states different values of N are used and then for each given N the corresponding MAP model is searched, and finally the best of the models found is chosen.

To illustrate the difficulty of the problem we return to the Moore machine of FIG. 1. Considering that it has produced an output abcabcabab, or rewritten using the discrete-time alphabet 110100110100110110. Assuming M=2, $v_1$=1, $v_2$=0, and that no observation error has occurred, then the observation sequence O is the same as the Moore machine's output.

In the following, two very simple HMMs will be examined and compared. For the smallest possible number of states, N=1, we arrive at a model defined by A=[1], $$b_1(1) = \frac{5}{9}, b_1(2) = \frac{4}{9},$$

and $\pi_1$=1. The probability of this radar model $\lambda^{(1)}$ producing the sequence O is $$P[O \mid \lambda^{(1)}] = \left(\frac{5}{9}\right)^{10}\left(\frac{4}{9}\right)^{8}$$

$$\approx 4.3 \times 10^{-6}.$$

For the number of states being equal to the number of observation symbols of the observation sequence O, N=18, we arrive at the model defined by A being equal to the N×N diagonal matrix, $b_t(1)$=1 and $b_t(2)$=0 for t such that $o_t$=1, and $b_t(1)$=0 and $b_t(2)$=1 for t such that $o_t$=0, $\pi_1$=1, and $\pi_i$=0 for $2 \le i \le 18$. The probability of this radar model $\lambda^{(2)}$ producing the sequence O is $$P[O \mid \lambda^{(2)}] = (1)^{18}$$

$$= 1.$$

Which of the two models $\lambda^{(1)}$ or $\lambda^{(2)}$ should be chosen? The latter is more likely to have produced the sequence O, but has a number of states equal to the number of observation symbols of the observation sequence O. However, is the latter model plausible? Answering such a question requires prior knowledge, for example, from radar engineering. Consequently, the success of automatic HMM training depends as much on the use of prior knowledge in the form of $P[\lambda]$, as on the maximization of the probability of the sequence being observed from the model $P[O|\lambda]$.

Given a lack of prior statistics the maximum likelihood model $$\lambda_{ML} = \underset{\lambda}{\operatorname{argmax}} P[O \mid \lambda] \quad (17)$$

is considered, which is considerably simpler than the MAP problem. Still, there is no known way for analytically solving the ML problem.

Assuming knowledge of the number of states N the ML problem is iteratively solved using the Baum-Welch method, which is, for example discussed in Baum, L. E. "An Inequality and Associated Maximization Technique in Statistical Estimation for Probabilistic Functions of Markov Processes", Inequalities, 3, 1–8, (1972). The solution of the ML problem leads to local maxima of the probability of the sequence being observed from the model, $P[O|\lambda]$. In most problems of interest, the optimization surface is complex and has many local maxima and, therefore, the solution found, $\lambda_{BW}$, is not necessarily the optimum.

Before describing the iterative solution, we first define the backward variable as $$\beta_t(i) = P[o_{t+1} o_{t+2} \ldots o_T \mid q_t = i, \lambda] \quad (18)$$

i.e. the probability of observing the partial sequence ($o_{t+1} o_{t+2} \ldots o_T$) for a given state i at time t and a given model $\lambda$. The backward variable at time T is arbitrarily defined as $$\beta_T(i) = 1, \; 1 \le i \le N. \quad (19)$$

Proceeding inductively, we obtain for $1 \le t \le T-1$, $$\beta_t(i) = \sum_{j=1}^{N} a_{ij} b_j(o_{t+1}) \beta_{t+1}(j), \; 1 \le i \le N. \quad (20)$$

We define the probability of being in state i and at time t and state j at time t+1, given the observation sequence and the model, as $$\xi_t(i,j) = P[q_t=i, q_{t+1}=j | O, \lambda]. \quad (21)$$

Using the definitions of the forward and backward variables $\xi_t(i,j)$ is written in the form $$\xi_t(i,j) = \frac{\alpha_t(i) a_{ij} b_j(o_{t+1}) \beta_{t+1}(j)}{P[O|\lambda]} \quad (22)$$

$$= \frac{\alpha_t(i) a_{ij} b_j(o_{t+1}) \beta_{t+1}(j)}{\sum_{i=1}^{N} \sum_{j=1}^{N} \alpha_t(i) a_{ij} b_j(o_{t+1}) \beta_{t+1}(j)}.$$

Next we define the variable $$\gamma_t(i) = P[q_t=i | O, \lambda] \quad (23)$$

as the probability of being in state i at time t, given the observation sequence and the model. Using the definitions of the variables $\alpha_t(i)$, $\beta_t(i)$, and $\xi_t(i,j)$, $\gamma_t(i)$ is rewritten in the form $$\gamma_t(i) = \frac{\alpha_t(i) \beta_t(i)}{P[O|\lambda]} \quad (24)$$

$$= \frac{\alpha_t(i) \beta_t(i)}{\sum_{i=1}^{N} \alpha_t(i) \beta_t(i)}$$

$$= \sum_{j=1}^{N} \xi_t(i,j).$$

If we sum $\gamma_t(i)$ over time, we get the expected number of transitions from state i. Similarly, if we sum $\xi_t(i,j)$ over time, we get the expected number of transitions from state i to state j.

Based on the above variables and formulas, the following equations are used to iteratively estimate π, A, and B:

$$\bar{\pi}_i = \gamma_t(i) \quad (25)$$

$$\bar{a}_{ij} = \frac{\sum_{t=1}^{T-1} \xi_t(i,j)}{\sum_{t=1}^{T-1} \gamma_t(i)} \quad (26)$$

$$\bar{b}_j(k) = \frac{\sum_{t^*} \gamma_t(j)}{\sum_{t=1}^{T} \gamma_t(j)}, \quad (27)$$

wherein t* is such that $o_t = v_k$.

Denoting the current model as λ=(A,B,π) equations (25)–(27) are then used to estimate a new model $\bar{\lambda}=(\bar{A},\bar{B},\bar{\pi})$. It has been proven that if $\bar{\lambda} \neq \lambda$, then the probability of O being observed from the model has increased, i.e. $P[O|\bar{\lambda}] > P[O|\lambda]$. In a following iteration step the current model is set equal to the new model and equations (25)–(27) are then used again to re-estimate the model. If $\bar{\lambda}=\lambda$ a limit has been reached and the model $\bar{\lambda} = \lambda_{BW}$ corresponds to a local maximum of $P[O|\lambda]$.

Again the optimization surface is very complex and has many local maxima. Therefore, the model $\lambda_{BW}$ found by the iterative solution depends to a large extent on the initial condition, i.e. the radar model λ defined as current in the first estimation.

Figure 10:
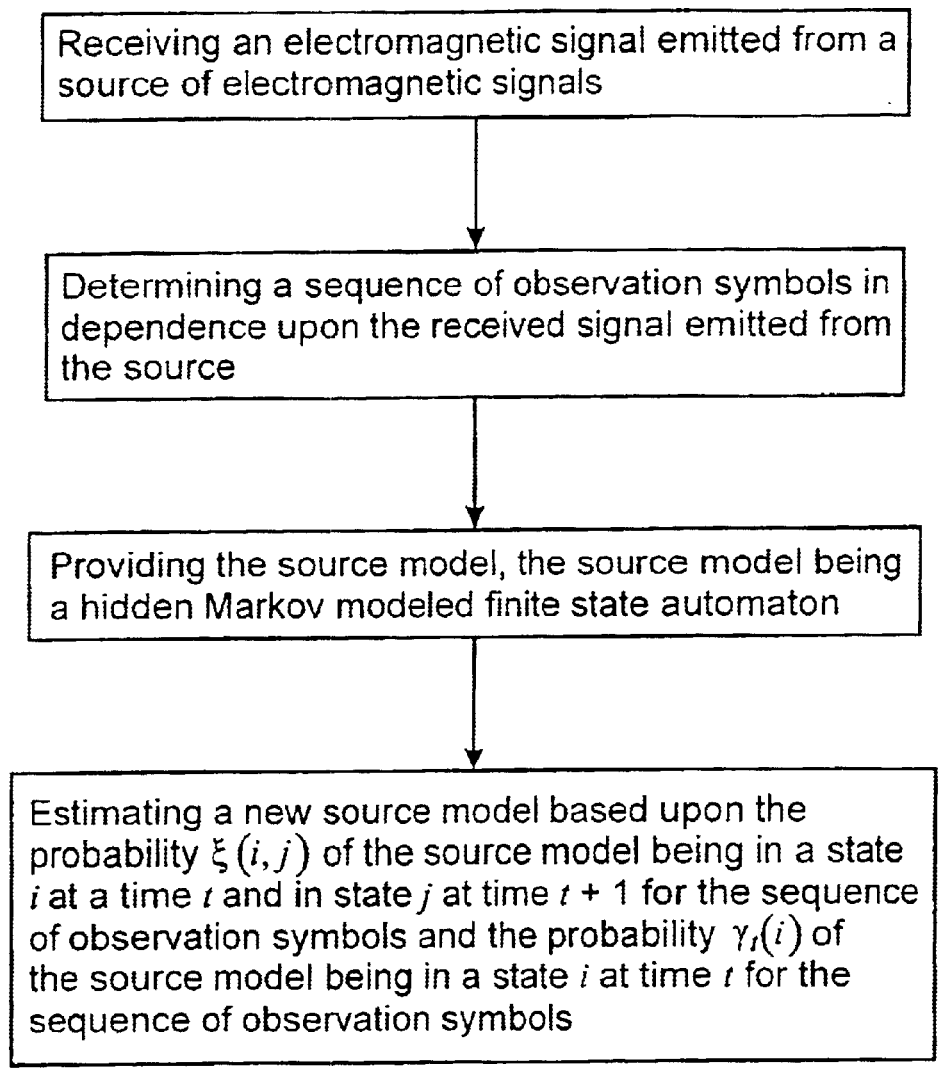

Referring to FIG. 10 a simplified flow diagram of a method for training a radar model according to the invention is shown.

The new method according to the invention provides the capability for recognizing modern radar systems. Describing the radar system as a finite state automaton and transforming it into a HMM provides flexibility and preserves a maximum of information provided by the observed signals. The new method is compatible with conventional receiver front-ends and allows integration into a wide range of legacy ES, EA and ELINT systems. The only hardware requirement is a fast processor with sufficient memory.

Numerous other embodiments of the invention will be apparent to persons skilled in the art without departing from the spirit and scope of the invention as defined in the appended claims.

What is claimed is:

1. A method for identifying a non-cooperative source of electromagnetic signals comprising the steps of:

receiving an electromagnetic signal emitted from the source;

providing a finite state automaton for modeling the source, the finite state automaton comprising a finite set of states and a set of transitions from state to state that occur in dependence upon an input signal, the finite state automaton for producing a sequence of output symbols from an output alphabet in dependence upon the state transitions, such that the sequence of output symbols corresponds to the received electromagnetic signal emitted from the source;

hidden Markov modeling of the finite state automaton and determining parameters of the hidden Markov model such that a sequence of observation symbols produced from an observation alphabet or multivariate observations produced from a continuous distribution by the hidden Markov model is equal to the sequence of output symbols; and, identifying the source in dependence upon the determined parameters of the hidden Markov model.

2. A method for identifying a source of electromagnetic signals as defined in claim 1, wherein the finite state automaton and the hidden Markov model have a same number of states.

3. A method for identifying a source of electromagnetic signals as defined in claim 2, wherein a sequence of observation signals produced from an observation alphabet is equal to the sequence of the output signals and wherein the output alphabet and the observation alphabet are identical.

4. A method for identifying a source of electromagnetic signals as defined in claim 1, wherein the finite state automaton and the hidden Markov model have a different number of states.

5. A method for identifying a source of electromagnetic signals as defined in claim 4, wherein a sequence of observation signals produced from an observation alphabet is equal to the sequence of the output signals and wherein the output alphabet and the observation alphabet are different.

6. A method for identifying a source of electromagnetic signals as defined in claim 1, wherein a sequence of observation signals produced from an observation alphabet is equal to the sequence of the output signals and wherein all symbols of the observation alphabet have the same duration.

7. A method for identifying a source of electromagnetic signals as defined in claim 1, wherein a sequence of observation signals produced from an observation alphabet is equal to the sequence of the output signals and wherein all symbols of the observation alphabet do not have the same duration.

8. A method for identifying a source of electromagnetic signals as defined in claim 7, wherein at least two different durations are different integer multiples of a same time period.

9. A method for identifying a source of electromagnetic signals as defined in claim 1, wherein errors occurring during observation of the electromagnetic signal are considered in the hidden Markov model through an observation symbol or multivariate observation probability distribution.

10. A method for classifying source models in dependence upon an electromagnetic signal emitted from a source of electromagnetic signals comprising the steps of:
    receiving the electromagnetic signal emitted from the source;
    providing a plurality of L source models λ such that the L source models λ have L different observation alphabets or continuous distributions comprising symbols or multivariate observations being integer multiples of L different time periods, the source models λ being hidden Markov modeled finite state automatons;
    transforming the received electromagnetic signal into L sequences of observation symbols or multivariate observations O using the L different observation alphabets or continuous distributions; and,
    determining for each combination of a source model λ of the L source models with a sequence of observation symbols or multivariate observations $O^{(l)}$ of the L sequences of observation symbols or multivariate observations an observation probability $P[\lambda^{(l)}|O^{(l)}]$, $1 \leq l \leq L$ of the source model λ for producing the sequence of observation symbols or multivariate observations $O^{(l)}$.

11. A method for classifying source models as defined in claim 10, wherein the observation probability $P[O|\lambda]$ is determined using a forward-backward procedure.

12. A method for classifying source models as defined in claim 11, comprising the step of determining a most probable source model by maximizing a posteriori probability based upon the observation probabilities $P[\lambda^{(l)}|O^{(l)}]$, $1 \leq l \leq L$ and the probabilities $P[\lambda^{(l)}]$, $1 \leq l \leq L$ of the source models λ.

13. A method for classifying source models as defined in claim 11, comprising the step of determining a most probable source model by using maximum likelihood decision based upon the observation probabilities $P[\lambda^{(l)}|O^{(l)}]$, $1 \leq l \leq L$.

14. A method for decoding an electromagnetic signal emitted from a source of electromagnetic signals comprising the steps of:
    receiving the electromagnetic signal emitted from the source;
    determining a sequence of observation symbols or multivariate observations O in dependence upon the received electromagnetic signal;
    providing a source model λ, the source model λ being a hidden Markov modeled finite state automaton;
    determining a plurality of sequences of state transitions Q of the hidden Markov modeled finite state automaton; and,
    determining for each of the sequences of state transitions Q a probability of occurrence $P[Q|O, \lambda]$ with respect to the sequence of observation symbols or multivariate observations O.

15. A method for decoding an electromagnetic signal emitted from a source of electromagnetic signals as defined in claim 14, comprising the step of determining the most probable sequence of state transitions by maximizing the probability of occurrence $P[Q|O, \lambda]$.

16. A method for predicting a second portion of an electromagnetic signal based upon a first portion of the electromagnetic signal emitted from a source of electromagnetic signals comprising the steps of:
    receiving the first portion of the electromagnetic signal;
    determining a partial sequence of observation symbols or multivariate observations $O_t$ in dependence upon the received first portion of the signal;
    providing a source model, the source model being a hidden Markov modeled finite state automaton;
    determining for each observation symbol or multivariate observation of an observation alphabet or continuous distribution of the source model a probability for being the next symbol or multivariate observation at time t+1 in the sequence of observation symbols or multivariate observations O based on a state transition probability distribution at time t of the source model and an observation symbol or multivariate observation probability distribution of the source model at time t; and,
    determining a most probable observation symbol or multivariate observation.

17. A method for predicting a second portion of an electromagnetic signal as defined in claim 16, wherein the probability for being the next observation symbol or multivariate observation is determined using a forward-backward procedure.

18. A method for predicting a second portion of an electromagnetic signal as defined in claim 17, comprising the step of determining for each observation symbol or multivariate observation of an observation alphabet or continuous distribution of the source model a probability for being the next observation symbol or multivariate observation at time t+2 in the sequence of observation symbols or multivariate observations O based on a state transition probability distribution at time t+1 of the source model and an observation symbol or multivariate observation probability distribution of the source model at time t+1.

19. A method for training a source model of a source emitting electromagnetic signals comprising the steps of:
    receiving an electromagnetic signal emitted from the source;
    determining a sequence of observation symbols or multivariate observations in dependence upon the received signal emitted from the source;
    providing the source model, the source model being a hidden Markov modeled finite state automaton; and,
    estimating a new source model based upon the probability $\xi_t(i,j)$ of the source model being in state i at time t and in state j at time t+1 for the sequence of observation symbols or multivariate observations and the probability $\gamma_t(i)$ of the source model being in state i at time t for the sequence of observation symbols or multivariate observations.

20. A method for training a source model of a source emitting electromagnetic signals as defined in claim 19, comprising the steps of:
    replacing the source model with the new source model if the new source model differs from the source model; and,
    re-estimating another new source model based upon the probability of the new source model being in state i at time t and in state j at time t+1 for the sequence of observation symbols or multivariate observations and the probability of the new source model being in state i at time t for the sequence of observation symbols or multivariate observations.

* * * * *